United States Patent [19]

Maeda

[11] Patent Number: 4,564,001
[45] Date of Patent: Jan. 14, 1986

[54] VESSEL FOR USE WITH HIGH-FREQUENCY INDUCTION HEATER

[75] Inventor: Tsuneo Maeda, Toyonaka, Japan

[73] Assignees: The Nippon Aluminium Mfg. Co., Ltd., Osaka; The Nippon Alumi Tsurmuraru Corp. Co., Mikunihon, both of Japan

[21] Appl. No.: 621,788

[22] Filed: Jun. 18, 1984

[30] Foreign Application Priority Data

Jun. 20, 1983 [JP] Japan .................. 58-95614[U]

[51] Int. Cl.[4] .................................. A47J 27/00
[52] U.S. Cl. ..................... 126/390; 220/453; 220/458
[58] Field of Search ........... 126/390; 220/453, 458, 220/456, 468; 428/652, 653, 685

[56] References Cited

U.S. PATENT DOCUMENTS

| | | | |
|---|---|---|---|
| 1,555,484 | 9/1925 | Rosenberg | 126/390 |
| 1,879,212 | 9/1932 | Hainlen | 126/390 X |
| 2,944,917 | 7/1960 | Cahne | 126/390 X |
| 3,017,492 | 1/1962 | Jepson | 126/390 X |
| 3,241,545 | 3/1966 | Reinert et al. | 126/390 X |
| 4,167,606 | 9/1979 | Ulam | 126/390 X |

FOREIGN PATENT DOCUMENTS

| | | | |
|---|---|---|---|
| 552901 | 12/1928 | Fed. Rep. of Germany | 126/390 |
| 38796 | 1/1924 | Norway | 126/390 |
| 322138 | 11/1929 | United Kingdom | 126/390 |

*Primary Examiner*—Randall L. Green
*Attorney, Agent, or Firm*—Browdy and Neimark

[57] ABSTRACT

A vessel for use with a high-frequency induction heater, having a bottom wall adapted to be heated by the induction heater for heating fluid contents of the vessel. At least the bottom wall is made from a cladding composite which consists of an aluminum alloy layer and a stainless steel layer clad with each other under pressure. The aluminum alloy layer is disposed on the inner side of the vessel, and consists of not more than 0.30 wt % of Si, not more than 0.7 wt % of iron, not more than 0.25 wt % of copper, 1.0–1.5 wt % of manganese, 0.8–1.3 wt % of magnesium, not more than 0.25 wt % of zinc, and the balance being aluminum.

12 Claims, 5 Drawing Figures

VESSEL FOR USE WITH HIGH-FREQUENCY INDUCTION HEATER

BACKGROUND OF THE INVENTION

The present invention relates generally to a vessel at least a bottom wall of which is adapted to be heated through high-frequency electromagnetic induction heating for heating fluid contents of the vessel. More particularly, the invention is concerned with pots and pans usable on a high-frequency electromagnetic induction cooking heater.

A high-frequency induction heating instrument such as a cooking apparatus using such an induction heater, is provided with a top plate on which is placed a suitable vessel such as a pot or pan, and further provided with an inductor coil disposed on the lower side of the top plate. The bottom plate or bottom wall of the vessel on the top plate is heated with heat produced by high-frequency eddy currents which are induced in the bottom wall of the vessel by the electromagnetic field produced by the inductor coil of the heater. Consequently, the materials for the pots and pans for an induction-heating cooking apparatus are limited to magnetic metals such as iron and stainless steel. However, as the magnetic metals are relatively low in coefficient of thermal conductivity, pots or pans made of such magnetic metals suffer an inconvenience of uneven heat distribution through a mass of the contents to be cooked, particularly in the case where the contents to be cooked are materials for curry sauce (curry paste), stew or the like which are not expected to undergo a sufficient degree of convection, where the pot or pan has a comparatively large depth, and where an induction-heating cooking apparatus used is designed to heat only the bottom portion (bottom wall) of the pot or pan. That is, the temperature of the side wall of the vessel is held relatively low due to low thermal conductivity of the magnetic metal of the vessel and due to poor convection of the contents to be heated, thereby making it difficult to achieve even or uniform heating of the contents of the vessel, which is an essential requirement in cooking fluid materials in a pot or pan.

For cooking on a high-frequency electromagnetic heater, there has been known a pot which is a vessel made of aluminum or aluminum alloy having a high thermal conductivity. The bottom plate of the vessel is backed at its lower surface by an iron sheet (magnetic material). Although the aluminum or aluminum alloy body is highly thermally conductive, it permits a high degree of heat dissipation during heating of the vessel. In other words, a large amount of heat is dissipated in the atmosphere through the side wall of the vessel during cooking of the contents, thereby causing a heat loss which leads to difficulty to attaining even heating of the contents of the vessel. Also known is a pot which is press-formed from a composite material which is an aluminum sheet sandwiched on opposite sides thereof by stainless steel sheets. Although this arrangement permits good heat transfer towards an upper part of the side wall of the pot through the highly conductive core layer of aluminum, the heat in the side wall is blocked by the inner stainless steel layer with a low thermal conductivity, and thereby hindered from being transferred to the contents of the pot. Therefore, this type of pot also suffers the same inconvenience as indicated above.

To minimize the above inconvenience experienced in the prior art, the assignees of the present invention have proposed a vessel for a high-frequency induction cooking heater, as indicated in Japanese Utility Model Application No. 578-83036 (published on Dec. 9, 1983 under Publication No. 58-185149), wherein the outer side of the vessel is formed of iron, stainless steel or other magnetic material, which allows high-frequency induction heating of the vessel while preventing heat dissipation through the side wall outwardly of the vessel. On the other hand, the inner side of the vessel is formed of aluminum or other highly thermally conductive material, so as to improve the heat conduction towards the upper part of the side wall and consequently to the contents of the vessel.

At least a bottom portion or bottom plate of a vessel such as pots and pans as described above, for use with a high-frequency electromagnetic induction heater, is press-formed of a combination of a magnetic material and a highly thermally conductive metal. For example, the bottom portion is formed from a cladding consisting of a stainless steel sheet and an aluminum alloy sheet which are clad with each other under pressure, so that the aluminum alloy sheet is disposed on the inner side of the vessel. However, it has been found that such a bottom portion of the vessel has a drawback to be solved for improvement in the quality of the vessel. Stated more specifically, a vessel for use with an electromagnetic induction heater generally employs, for easier induction heating, a ferrite-based stainless steel. Such vessels for general domestic applications are made, for example, of a stainless steel material which consists of: 0.015% of carbon (C); 0.49% of silicon (Si); 0.54% of manganese (Mn); 0.026% of phosphorus (P); 0.003% of sulfur (S); 16.75% of chromium (Cr); 0.38% of copper (Cu); 0.52% of niobium (Nb); and the balance being iron (Fe). On the other hand, aluminum pots are commonly made of Al-Mn alloy as per AA Standard 3003. To make a blank material for a pot, a composite sheet, i.e., a cladding (clad metal sheet) was prepared by cladding these commonly used materials, Al-Mn alloy of AA 3003 and the stainless steel of the above indicated composition. The cladding was press-formed into shape such that the aluminum alloy layer was disposed on the inner side of the pot. This experimental manufacture revealed that the aluminum alloy layer (AA 3003) of the formed pot had a surface quality too poor to enable the pot to serve.

SUMMARY OF THE INVENTION

It is therefore a primary object of the present invention to provide a vessel for use with a high-frequency induction heater, which is capable of heating fluid contents thereof with even heat distribution and minimum heat dissipation.

It is another object of the invention to provide such a vessel at least a bottom portion of which is press-formed from a so-called Al-SUS cladding (clad sheet) which consists of an aluminum alloy sheet and a stainless steel sheet clad with each other under pressure, such that the Al alloy sheet (layer) is disposed on the inner side of the vessel, and provided with a smooth inner surface quality.

A further object of the invention is the provision of such a vessel which is improved in stability of seating thereof on the high-frequency induction heater, that is, which has a structure free from easy spinning, rocking, rolling, tottering or rattling movements during cooking of the contents, as in stirring the contents.

According to the present invention and to attain the above and other objects of the invention, there is provided a vessel at least a bottom wall of which is adapted to be heated through high-frequency induction heating for heating fluid contents contained in the vessel. At least the bottom wall of the vessel of the invention is made from a cladding which consists of an aluminum alloy layer and a stainless steel layer clad with each other under pressure. The aluminum alloy layer is disposed on the inner side of the vessel, and consists of: not more than 0.30 wt% of silicon; not more than 0.7 wt% of iron; not more than 0.25 wt% of copper; 1.0–1.5 wt% of manganese; 0.8–1.3 wt% of magnesium; not more than 0.25 wt% of zinc; and the balance being aluminum.

In accordance with one advantageous form of the invention, the stainless steel of the stainless steel layer is of ferrite structure. Preferably, the stainless steel layer consists of: 0.015–0.025 wt% of carbon; 0.49–1.0 wt% of silicon; 0.54–1.0 wt% of manganese; 0.026–0.040 wt% of phosphorus; 0.003–0.005 wt% of sulfur; 16.0–19.0 wt% of chromium; 0.30–0.80 wt% of copper; 0.30–0.80 wt% of niobium; and the balance being iron.

In accordance with a preferred form of the invention, the stainless steel layer of the cladding has a thickness smaller than that of the aluminum alloy layer. The thickness of the stainless steel layer is held within a range of 0.1–0.5 mm, and that of the aluminum alloy layer is within a range of 0.5–3.0 mm.

In accordance with a further advantageous aspect of the invention, the vessel further has a cylindrical side wall extending from a peripheral edge of the bottom wall. This cylindrical side wall cooperates with the bottom wall to define a container in the form of a pot or pan. This container may be typically adapted to be placed on a high-frequency induction cooking heater, and particularly suitable for cooking fluid food stuff or materials which consist of a viscous fluid such as materials for curry sauce of paste, or stew, which is easy to undergo convection. The whole of the container may be made from the previously indicated cladding.

In the above embodiment, the aluminum alloy layer defining an inner surface of the cladding may be preferably coated with an alumite layer having a thickness of 6–10 microns, or with a fluororesin layer having a thickness of 20–30 microns.

Advantageously, a central portion of the bottom wall of the vessel may be raised inwardly of the container, away from a peripheral portion thereof adjacent to the peripheral edge. The height of the raised central portion from the plane of the peripheral portion is selected such that the central portion will not protrude away from the peripheral portion outwardly of the container due to strain generated in the container during its long period of service under heat. Preferably, the height of the bottom wall at its center is not greater than 6 mm.

In the above advantageous form of the vessel, the peripheral portion of the bottom wall has a flat annular bottom bearing surface at which the vessel seats on a top plate of a high-frequency induction cooking heater. The diameter of the raised central portion is preferably one-fifth to one-third of an outside diameter of the annular bottom bearing surface.

BRIEF DESCRIPTION OF THE DRAWING

The above and other objects, features and advantages of the present invention will be better understood from reading the following description of the preferred embodiments taken in conjunction with the accompanying drawing in which.

DETAILED DESCRIPTION OF THE PREFERRED EMBODIMENTS

Referring to the accompanying drawing, preferred embodiments of a vessel of the invention will be described in detail.

Figure 1:
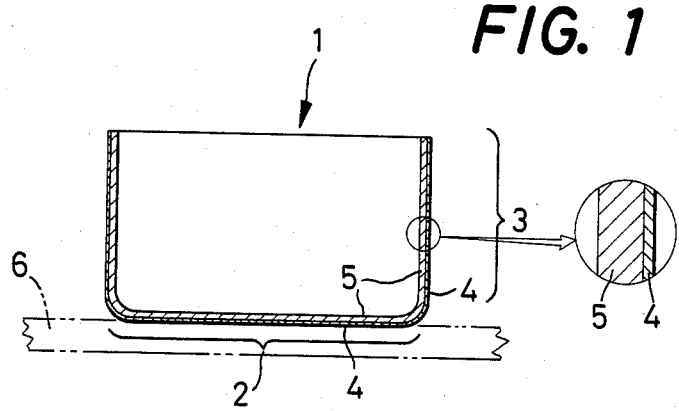
FIG. 1 is an elevational view in cross section of one embodiment of a pot of the invention for use with a high-frequency electromagnetic induction cooking heater.

There is shown in FIG. 1 an embodiment of the invention adaped to be usable with a high-frequency electromagnetic induction cooking heater, wherein a pot 1 comprises a circular bottom wall 2 and a cylindrical side wall 3 which extends from the peripheral edge of the bottom wall and cooperates with the bottom wall 2 to define a container in the form of the pot 1. These bottom and side walls 2, 3 comprise an outer stainless steel layer 4 and an inner aluminum alloy layer 5. The aluminum alloy layer 5 is thicker than the stainless steel layer 4. For example, if the stainless steel layer 4 is 0.1–0.5 mm thick, the aluminum alloy layer 5 is adapted to have a thickness of about 0.5–3.0 mm. The pot 1 is fabricated, in a press-forming process, from a cladding which consists of a stainless steel sheet and an aluminum alloy sheet which have been clad with each other by rolling under pressure. The stainless steel sheet and the aluminum alloy sheet which form the layers 4 and 5, respectively, have the compositions listed in Tables 1 and 2, respectively.

TABLE 1

| | Stainless Steel Composition (wt %) | | | | | | |
|---|---|---|---|---|---|---|---|
| | C | Si | Mn | P | S | Cr | Cu | Nb |
| SUS | 0.015 | 0.49 | 0.54 | 0.026 | 0.003 | 16.75 | 0.38 | 0.52 |

TABLE 2

| | Aluminum Alloy Composition (wt %) | | | | | | |
|---|---|---|---|---|---|---|---|
| | Si | Fe | Cu | Mn | Mg | Zn | Al |
| AA3004 | max. 0.30 | max. 0.7 | max. 0.25 | 1.0–1.5 | 0.3–1.3 | max. 0.25 | Balance |

The stainless steel and aluminum alloy layers 4 and 5 have, on their contact surfaces, minute projections and indentations which are mechanically interlaced with each other upon rolling of the two sheets into the single cladding metal sheet. The inner surface of the aluminum alloy layer 5 is coated with an alumite layer (anodic oxidation film) or a layer of fluororesin such as a polytetrafluroethylene layer, before or after the cladding sheet blank is press-formed into the pot 1. The thickness of the alumite layer is held within 6–10 microns, and that of the fluororesin layer is held within about 20–30 microns. With such a relatively small thickness, the coating layer on the aluminum alloy layer 5 will have substantially no influence on the thermal conductivity of the layer 5 on its inner side. The side wall 3 has a height (depth) which is selected within a range of 0.2-0.6D, where D represents a diameter of the circular bottom wall 2.

The pot 1 of FIG. 1 holds, for example, fluid contents with high viscosity, such as materials for curry sauce or paste and stew, such that about one-third of the whole volume is filled with the contents. The pot 1 is placed on a top plate 6 of a high-frequency electromagnetic induction heating cooking apparatus (hereinafter referred to as electromagnetic induction cooking heater). The cooking of the contents is effected by energizing an inductor coil (not shown) disposed on the lower side of the top plate 6. Upon energization of the inductor coil, the electromagnetic field produced by the coil will cause eddy currents to be induced in the stainless steel layer 4 on the lower side of the bottom wall 2, whereby the bottom wall 2 is heated at a high rate. The heat generated in the stainless steel layer 4 at the bottom wall 2 is transferred to the contents of the pot 1 immediately through the inner aluminum alloy layer 5 at the bottom wall 2, and then through the aluminum alloy layer 5 at the side wall 3. The heat transferred to the inner aluminum alloy layer 5 at the side wall 3 surrounds the contents circumferentially of the pot 1. Thus, the contents may be heated in the pot 1.

In the above described construction of the pot 1 wherein the outer layer 4 is made of stainless steel of the composition shown in Table 1, and the inner layer is made of aluminum alloy (AA3004) with a high thermal conductivity, it is possible to attain an even heating of the contents of the pot 1 and minimize heat dissipation through the side wall 3 into the atmosphere. Stated more specifically, the stainless steel layer 4 on the lower or bottom side of the bottom wall 2 permits an intended high-frequency electromagnetic heating because the layer 4 is a magnetic material. On the other hand, the aluminum alloy layer 5 which extends from the bottom wall 2 to form the inner surface of the side wall 3, serves to achieve smooth and fast transfer of heat from the bottom wall 2 towards the side wall 3, whereby the contents of the pot 1 may be heated uniformly through contact thereof with the inner circumferential surface of the side wall 3. This contact is accomplished directly or indirectly via an extremely thin layer of alumite or fluororesin (commercially known, for example, as "Teflon"). In the latter case of indirect contact, the alumite or "Teflon" coating will not affect the thermal conductivity of the aluminum alloy layer 5 because the coating is extremely thin. The stainless steel layer 4 of the side wall 3 acts to minimize the heat dissipation from the side wall 3 into the atmosphere because the stainless steel is low in thermal conductivity, whereby the efficiency of heating the contents through the side wall 3 may be improved. The combinative use of aluminum alloy having the composition (AA3004) of Table 2, and stainless steel having the composition of Table 1, allows press-forming of the pot 1 with smooth surface quality on the side of the aluminum alloy layer 5, even when the pot 1 has a considerably large depth, thereby making it possible to attain the primary object of the invention. That is, the previously indicated aluminum alloy and stainless steel materials cooperate to contribute easy mass production of such deep pots with uniformly excellent quality.

One-third of the volume of the pot 1 of FIG. 1 was filled with water, and the electromagnetic induction cooking heater was energized to heat the water in the pot 1. When the water was boiled at the bottom portion of the pot 1, the side wall 3 was heated to such a temperature that its upper edge portion may not be touched or gripped directly with fingers. This is contrary to the result of a similar test performed on a traditional stainless steel pot, wherein the upper edge portion of its side wall could be gripped with fingers even when the water was boiled at the bottom portion of the pot.

The high-frequency induction heating of the pot according to the invention may be effected, provided the thickness of the stainless steel layer 4 is held not less than 0.1 mm. In the meantime, the thickness of the aluminum alloy layer 5 must be larger than that of the stainless steel layer 4, preferably within 0.5-3.0 mm, so that the heat is efficiently transferred toward the side wall 3 and so that the contents of the pot are heated uniformly.

In a vessel such as a pot according to the invention, it is advantageous that the bottom of the vessel be constructed such that its central portion is raised from the plane of its peripheral portion inwardly of the vessel. This centrally raised configuration of the bottom is intended to prevent the central portion from protruding away from the peripheral portion outwardly of the vessel, that is, to prevent separation of the peripheral portion away from the top plate of the electromagnetic induction cooking heater due to deformation or strain produced in the vessel during its long period of use. Preferred forms of this centrally raised arrangement of the bottom of a vessel will be described with reference to FIGS. 2-4.

Figure 2:
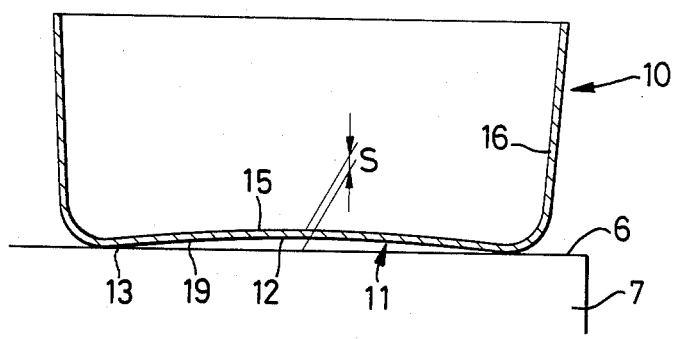
FIG. 2 is an elevational view in cross section of another embodiment of a pot of the invention, which is improved in configuration of its bottom wall.

In an elevational cross sectional view of FIG. 2, there is shown a pot 10 before it is put into service. This pot 10 is press-formed from an Al-SUS (Aluminum-Stainless Steel) clad metal sheet, in the same manner as previously indicated, such that its aluminum alloy layer is disposed on the inner side of the container. This pot 10 has a bottom surface 11 which is entirely or substantially entirely formed so as to define a part of a sphere having an extremely small curvature. Described in more detail, a central portion 12 of the bottom surface 11 is raised a slight distance S away from a peripheral portion 13 of the surface 11. This distance S, i.e., a height between the center of the central portion 12 and the plane of the peripheral edge, is selected or determined with considerations given to deformation of the pot 10 during its use, and for effective heating of the pot by an electromagnetic induction cooking heater 7. Preferably, the distance or height S is selected to be not greater than about 5-6 mm.

Described more particularly, the distance S is determined so that the central portion 12 of the bottom surface 11 will not protrude away from the plane of the peripheral portion 13, even after a long period of use of the pot 10 during which the central portion 12 is deformed or deflected outwardly or downwardly due to strain caused by difference in expansion ratio between a bottom wall 15 and a side wall 16 of the pot 10. That is, the distance or height S is selected so that the raised central portion 12 is kept flush with or located above the peripheral portion 13. In other words, the distance S is smaller than an expected distance of downward displacement of the central portion 12 during service of the pot 10. With the centrally raised configuration of the bottom wall 15 as manufactured, the pot 10, if deformed during its service for the foregoing reason, may seat on a flat top plate 6 of the heater 7, such that substantially the whole area of the bottom surface 11 or only the annular peripheral portion 13 (peripheral edge and the neighboring annular portion adjacent the central portion 12) is held in contact with the top plate 6 of the heater 7. Further, the distance S of the pot 10 as manufactured is selected so that an electromagnetic field produced adjacent the top plate 6 may sufficiently act on the central portion 12 of the bottom wall 15 to heat the bottom wall 15 through electromagnetic induction by the heater 7. Stated the other way, the previously indicated upper limit, 5-6 mm of the distance S, is determined based on the recongnition that the indentation of the bottom wall 15 to such maximum extent will still assure satisfactory heating of the entire portion of the bottom wall 15 and will not significantly reduce the heating efficiency of the pot 10.

While the bottom surface 11 (bottom wall 15) of the pot 10 of the above embodiment is of generally flattened, partially spherical configuration, it is possible to form the bottom surface 11 into a slightly conical shape. It is also possible to form the peripheral portion 13 with a flat annular bottom surface, and to provide a radially intermediate portion 19 between the flat peripheral portion 13 and the central portion 12, such that the intermediate portion 19 is slightly spherical or conical. As a further possible modification, the central portion 12 is made flat, and the intermediate portion 19 is tapered or stepped so that the flat central portion 12 is raised inwardly.

Figure 3:
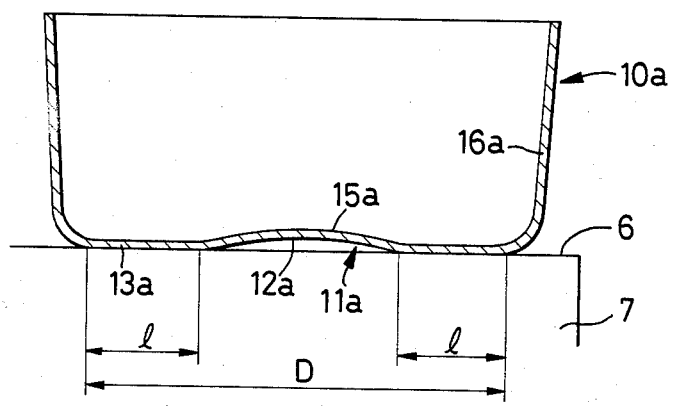
FIGS. 3 and 4 are elevational views in cross section of further embodiments with alternative improved bottom wall configuration.
Figure 4:
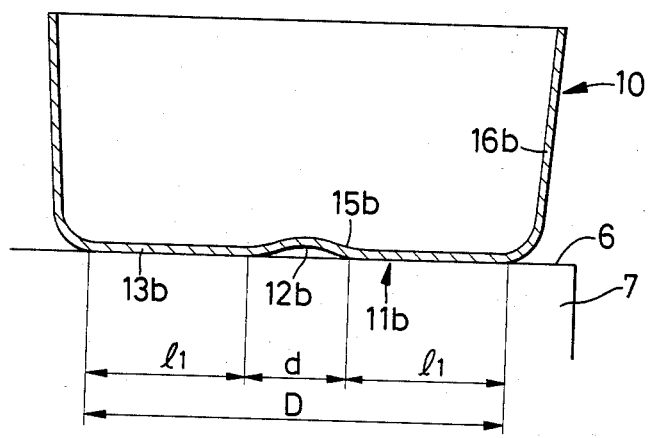

Examples of modified embodiments having a flat peripheral portion are illustrated in FIGS. 3 and 4. A pot 10a of FIG. 3 is provided with a bottom wall 15a which has a flat annular peripheral portion 13a serving as a bearing surface. A width l of the flat of the peripheral portion 13a as measured radially of the pot 10a, is selected to be about one-third ($\frac{1}{3}$) of a diameter D of a bottom surface 11a of the bottom wall 15a. In a pot 10b of FIG. 4, a width l1 of a flat annular peripheral portion 13b of a bottom wall 15b is selected such that a diameter d of a raised partially spherical central portion 12b is about one-fifth (1/5) of a diameter D of a bottom surface 11b. According to the invention, the diameter d of a raised central portion (12a, 12b) is generally held within a range of about 1/5 to about $\frac{1}{3}$ of the diameter D of a bottom surface (11a, 11b), i.e., of the outside diameter D of the flat annular peripheral portion (13a, 13b).

As described hitherto, the pot 10, 10a, 10b of the foregoing embodiments has the bottom surface 11, 11a, 11b which is formed during manufacture such that the central portion 12, 12a, 12b is raised or indented from the plane of the peripheral portion 13, 13a, 13b inwardly of the pot, so that the central portion is held flush or coplanar with, or slightly above, the plane of the peripheral portion even after the central portion is displaced outwardly or downwardly of the pot to its deformation during repeated use of the pot. Thus, the pot constructed according to the invention may always rest stably on the top plate 6 of the electromagnetic induction cooking heater 7, with its entire bottom surface 11, 11a, 11b or its peripheral portion 13, 13a, 13b placed in contact with the top plate 6 of the apparatus 7. As a result, the pot is free from spinning, rocking, rattling or other movements when the contents are stirred.

Figure 5:
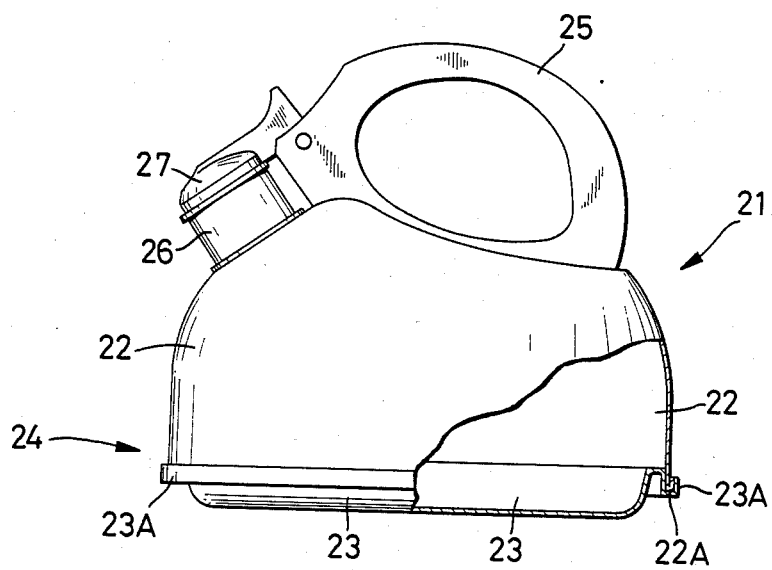
FIG. 5 is a partly cut-away elevational view of one form of a kettle embodying the present invention.

While the invention has been described in association with pots with a relatively large depth for use on a high-frequency induction heating cooking apparatus, it is apparent that the invention is not limited to these embodiments illustrated pots; the invention may be embodied as other types of vessels, for example, as a pan, or a kettle 21 illustrated in FIG. 5.

The kettle 21 includes a barrel or cylinder portion 22, and a bottom portion 23 which cooperates with the cylinder portion 22 to form a container 24. The cylinder portion 22 has an annular edge 22A defining a lower opening thereof, and the bottom portion 23 has a circular peripheral edge 23A which engages the annular edge 22A, whereby the two portions 22 and 23 are assembled into the integral container 4 adapted to be used on an electromagnetic induction cooking heater. The container 24 is provided, at its upper end, with a knob 25, and a spout (inlet/outlet) 26 which is plugged with a removable lid 27 incorporating a whistler. Thus, the kettle 21 is constituted by the container 24 (consisting of the cylinder and bottom portions 22 and 23), the knob 25 and the spout 26 with the lid 27.

In manufacturing the kettle 21, the cylinder and bottom portions 22 and 23 are fabricated from separate blanks, and assembled into the container 24. According to the present invention, at least the bottom portion 23 of the container 24 is press-formed from a suitable Al-SUS clading, i.e., a composite clad metal sheet consisting of aluminum alloy and stainless steel layers as previously described, such that the aluminum alloy layer is disposed on the inner side of the container 24.

While the invention has been specifically shown and described with reference to preferred embodiments thereof, it will be understood that the invention is not limited thereto, but various changes, modifications and improvements may occur to those skilled in the art without departing from the spirit and scope of the invention.

What is claimed is:

1. A vessel having a bottom wall adapted to be heated through high-frequency induction heating for heating fluid contents contained in the vessel, the improvement comprising:
    at least said bottom wall being made from a cladding which consists of an aluminum alloy layer having a thickness of 0.5-3.0 mm and a stainless steel layer having a thickness of 0.1-0.5 mm clad with each other under pressure, said aluminum alloy layer being disposed on the inner side of the vessel;
    said aluminum alloy layer consisting of not more than 0.30 wt% Si, not more than 0.7 wt% of iron, not more than 0.25 wt% of copper, 1.0-1.5 wt% of iron, not more than 0.25 wt% of copper, 1.0-1.5 wt% of manganese, 0.8-1.3 wt% of magnesium, not more than 0.25 wt% of zinc, and the balance being aluminum.

2. A vessel as set forth in claim 1, wherein the stainless steel of said stainless steel layer is of ferrite structure.

3. A vessel as set forth in claim 2, wherein said stainless steel layer consists of 0.015-0.025 wt% of carbon, 0.49-1.0 wt% of silicon, 0.54-1.0 wt% of manganese, 0.026-0.040 wt% of phosphorus, 0.003-0.005 wt% of sulfur, 16.0-19.0 wt% of chromium, 0.30-0.80 wt% of copper, 0.30-0.80 wt% of niobium, and the balance being iron.

4. A vessel as set forth in claim 1, further having a cylindrical side wall extending from a peripheral edge of said bottom wall and cooperating with the bottom wall to define a container in the form of a pot or pan.

5. A vessel as set forth in claim 4, wherein said aluminum alloy layer defining an inner surface of said cladding is coated with an alumite layer having a thickness of 6-10 microns.

6. A vessel as set forth in claim 4, wherein said aluminum alloy layer defining an inner surface of said cladding is coated with a fluororesin layer having a thickness of 20-30 microns.

7. A vessel as set forth in claim 4, wherein said container is a pot adapted to be place on a high-frequency induction cooking heater.

8. A vessel as set forth in claim 4, wherein said fluid contents to be heated in said container consists of a viscous fluid such as materials for curry sauce and stew, which is easy to undergo convection.

9. A vessel as set forth in claim 4, wherein said bottom wall comprises a peripheral portion adjacent to said peripheral edge and a central portion raised away from said peripheral portion inwardly of said container, a height of said raised portion from the plane of said peripheral portion being selected such that said central portion will not protrude away from said peripheral portion outwardly of said container due to strain generated in the container during its service.

10. A vessel as set forth in claim 9, wherein said height of said bottom wall at its center from said plane of the peripheral portion is not greater than 6 mm.

11. A vessel as set forth in claim 9, wherein said peripheral portion of the bottom wall has a flat annular bottom bearing surface, a diameter of said central portion being 1/5 to ⅓ of an outside diameter of said annular bottom bearing surface.

12. A vessel as set forth in claim 4, wherein the whole of said container is made from said cladding.

* * * * *